(12) United States Patent
Stirling-Gallacher et al.

(10) Patent No.: US 8,447,002 B2
(45) Date of Patent: May 21, 2013

(54) RECEIVING APPARATUS WITH FREQUENCY DOMAIN EQUALIZER

(75) Inventors: Richard Stirling-Gallacher, Stuttgart (DE); Ralf Boehnke, Esslingen (DE); Zhaocheng Wang, Beijing (CN)

(73) Assignee: Sony Corporation, Tokyo (JP)

(*) Notice: Subject to any disclaimer, the term of this patent is extended or adjusted under 35 U.S.C. 154(b) by 774 days.

(21) Appl. No.: 12/619,847

(22) Filed: Nov. 17, 2009

(65) Prior Publication Data

US 2010/0195710 A1 Aug. 5, 2010

(30) Foreign Application Priority Data

Feb. 2, 2009 (EP) .................................. 09151868

(51) Int. Cl.
*H04B 1/10* (2006.01)
(52) U.S. Cl.
USPC .......................................................... 375/350
(58) Field of Classification Search .................. 375/350, 375/229, 230, 232, 260, 316, 346; 370/206, 370/482
See application file for complete search history.

(56) References Cited

U.S. PATENT DOCUMENTS

| | | | |
|---|---|---|---|
| 7,012,882 B2 | 3/2006 | Wang et al. | |
| 7,668,076 B2 * | 2/2010 | Yoshida et al. | 370/208 |
| 2002/0001352 A1 | 1/2002 | Stirling-Gallacher et al. | |
| 2004/0174940 A1 | 9/2004 | Kim et al. | |
| 2007/0053526 A1* | 3/2007 | Gaal | 381/94.1 |
| 2007/0280363 A1 | 12/2007 | Im et al. | |
| 2007/0280366 A1 | 12/2007 | Aytur et al. | |
| 2009/0022253 A1 | 1/2009 | Yoshida et al. | |

FOREIGN PATENT DOCUMENTS

| | | |
|---|---|---|
| CN | 1350376 A | 5/2002 |
| WO | WO 99/56440 | 11/1999 |
| WO | WO 2007/037576 A1 | 4/2007 |
| WO | WO 2007/059518 A1 | 5/2007 |

OTHER PUBLICATIONS

U.S. Appl. No. 12/620,797, filed Nov. 18, 2009, Wang, et al.
U.S. Appl. No. 12/631,070, filed Dec. 4, 2009, Wang, et al.
A. Koppler, et al., "Timing of the FFT-Window in SC/FDE Systems", MC-SS 2003, Fourth Workshop on Multi-Carrier Spread Spectrum, Sep. 2003, 8 pages.
Pei-Yun Tsai, et al., "Frequency-Domain Interpolation-Based Channel Estimation in Pilot-Aided OFDM Systems", IEEE, http://ieeexplore.ieee.org/xpls/abs_all.jsp?arnumber=1387987 &isnumber=30201, vol. 1, May 17-19, 2004, pp. 420-424.

* cited by examiner

*Primary Examiner* — Khai Tran
(74) *Attorney, Agent, or Firm* — Oblon, Spivak, McClelland, Maier & Neustadt, L.L.P.

(57) ABSTRACT

The present invention relates to a receiving apparatus (1) for receiving signals in a wireless communication system, in which the signals comprise a dedicated channel estimation sequence, comprising a channel estimation means (6) adapted to perform a channel estimation on a dedicated channel estimation sequence comprised in a received signal, a noise reduction means (8) adapted to reduce noise in the channel estimation result obtained from the channel estimation means by setting complex samples of the channel estimation result which are below a noise threshold to zero, and a frequency domain equalizing means (12) adapted to perform an equalization on the received signal in the frequency domain on the basis of the noise reduced channel estimation result from the noise reduction means (8). The present invention further relates to corresponding method.
The present invention enables an improvement of the equalization performance.

Figure 1:
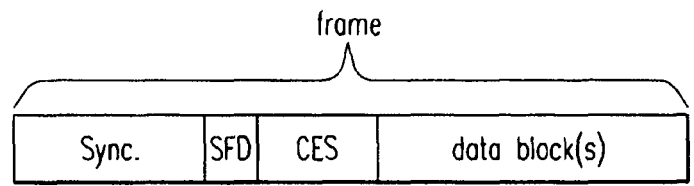

15 Claims, 2 Drawing Sheets

RECEIVING APPARATUS WITH FREQUENCY DOMAIN EQUALIZER

The present invention relates to a receiving apparatus for receiving signals in a wireless communication system, comprising a frequency domain equalizing means.

Frequency domain equalizers, i.e. equalizers which operate in the frequency domain, have received increased attention in view of the provision of robust and reliable wireless communication links between a transmitter and a receiver, for example (but not limited to) single carrier systems in which the data are transmitted in data blocks within time frames. In some prior art systems, there exists the problem that the quality and the performance of the equalization is reduced since additional noise is introduced by the transformation from the time domain to the frequency domain.

The object of the present invention is therefore to provide a receiving apparatus and a method for receiving signals in a wireless communication system, in which a frequency domain equalization is performed, having an improved performance.

The above object is achieved by a receiving apparatus according to independent claim 1 as well as a method for receiving signals according to independent claim 16.

The present invention suggests a receiving apparatus for receiving signals in a wireless communication system, in which the signals comprise a dedicated channel estimation sequence. The receiving apparatus comprises a channel estimation means adapted to perform a channel estimation on a dedicated channel estimation sequence comprised in a received signal, a noise reduction means adapted to reduce noise and a channel estimation result obtained from the channel estimation means by setting complex samples of the channel estimation result which are below a noise threshold to zero, and a frequency domain equalizing means adapted to perform an equalization on the received signal in the frequency domain on the basis of the noise reduced channel estimation result from the noise reduction means. The receiving method of the present invention comprises the corresponding method steps.

By using a noise threshold in order to suppress unwanted noise samples in the channel estimation result, it is possible to improve the performance of the equalization performed in the frequency domain equalizing means.

Advantageous features are defined in the dependent claims.

Advantageously, the noise reduction means is adapted to set the noise threshold in relation to a power level of the complex samples of the channel estimation result. The channel estimation means which can for example be a correlator, a matched filter or any other suitable element, performs the channel estimation on a digitized received signal and output digital complex samples having corresponding power levels. On the basis of the power levels of the digitized complex samples in the channel estimation result, a noise threshold can be determined and set, whereby all the complex samples which have a power level below the noise threshold are set to zero. Since the channel estimation is performed in the time domain, a transformation into the frequency domain is necessary for the frequency domain equalization. Since the samples having a power level below the noise threshold are set to zero, these samples do not have a performance degrading effect after the time to frequency domain transformation any longer so that the performance of the equalization is enhanced.

Further advantageously, the receiving apparatus comprises a peak detection means adapted to detect the complex sample having the highest power level of the samples of the channel estimation result as a peak complex sample, wherein the noise reduction means is adapted to set the noise threshold in relation to the detected highest power level (of the peak sample). In other words, the noise threshold is set flexibly in relation to the respective peak complex sample having the highest power level. Hereby, a flexible adaptation of the noise threshold level to the respective highest power level of the peak sample can be ensured thus enabling a further enhanced performance of the equalization. Hereby, the noise reduction means is advantageously adapted to set the noise threshold with a fixed difference to the detected highest power level. In this case, the implementation is less complex. Alternatively, it may be advantageous if the noise reduction means is adapted to set the noise threshold with a variable difference to the detected highest power level. For example, the noise reduction means may be adapted to set the variable difference depending on a quality of the received signal, such as but not limited to a detected or estimated signal to noise ratio, carrier to interference/noise ratio or any other suitable parameter of the received signal. Hereby, a further performance enhancement of the equalization may be achievable.

Further advantageously, the receiving apparatus comprises windowing means adapted to arrange the noise reduced channel estimation result in a window having a preset number of complex samples by determining the number of useful complex samples before and after the peak complex sample and setting the remaining samples to zero. The preset number of complex samples of the window corresponds to the number of samples used in the subsequent time to frequency transformation in which the channel estimation result is transformed to the frequency domain in which the equalization will be performed. The term useful samples is hereby intended to characterize the samples of the channel estimation result which are useful and which will actually be used for the succeeding equalization. Hereby, the windowing means is advantageously adapted to determine a respective preset number of complex samples as the useful samples before and after the peak complex sample. Alternatively, the windowing means is advantageously adapted to detect the first complex sample in the window before the peak complex sample having a power level above a pre-threshold and to determine the complex samples between the detected first complex sample and a preset number of samples after the peak complex sample as the useful samples. Further alternatively, the windowing means is adapted to detect a last complex sample in the window after the peak complex sample having a power level above a post threshold and to determine the samples between a preset number of complex samples before the peak complex samples and said detected last complex sample as the useful samples. Further alternatively, the windowing means is advantageously adapted to detect a first complex sample in the window before the peak complex sample having a power level above a pre-threshold and a last complex sample in the window after the peak complex sample having a power level above a post threshold and to determine the complex samples between the detective first complex sample and the detected last complex sample as the useful samples. The selection of first complex sample and the last complex sample, respectively may additionally be limited by the condition that the time between the first complex sample or the last complex sample and the peak complex sample should be less than a fixed time, which could for example be the guard interval time used in the wireless communication system or any other suitable time period.

Further advantageously, the windowing means is adapted to set the pre-threshold and the post threshold, respectively, in relation to the power level of the peak complex sample. Hereby, the windowing means may be adapted to set the pre-threshold and the post threshold, respectively either with a fixed difference or a variable difference to the detected highest power level.

Further advantageously, the receiving apparatus comprises a timing means adapted to perform a time synchronization on data comprised in the received signal, wherein the windowing means is adapted to supply timing information to the timing means on the basis of a first sample of the useful samples in a window.

It should be understood that the receiving apparatus (and the receiving method) of the present invention can be implemented in any kind of suitable device, unit, apparatus and so forth, if necessary in combination with other features and functionalities necessary for the respective application. For example, the receiving apparatus could be realized as a portable, handheld, standalone, permanent etc. device adapted to communicate in any kind of wireless communication system. For example, the receiving apparatus could be part of a communication apparatus adapted to receive and transmit signals in the wireless communication system. Further, the term "means" as used throughout the present application is intended to characterize any kind of implementation in a functional unit adapted to perform the respective functions, such as but not limited to any kind of unit, element, device, eventually in combination with other functionalities and implemented in software, hardware or mixture thereof.

Figure 2A:
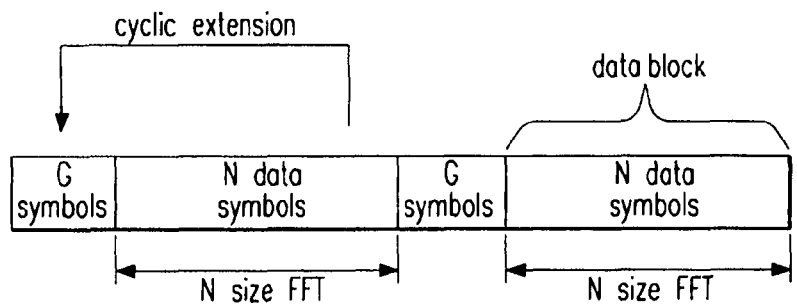
Figure 2B:
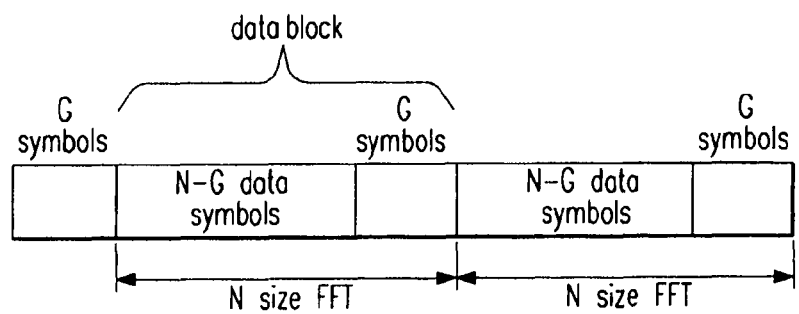
Figure 3:
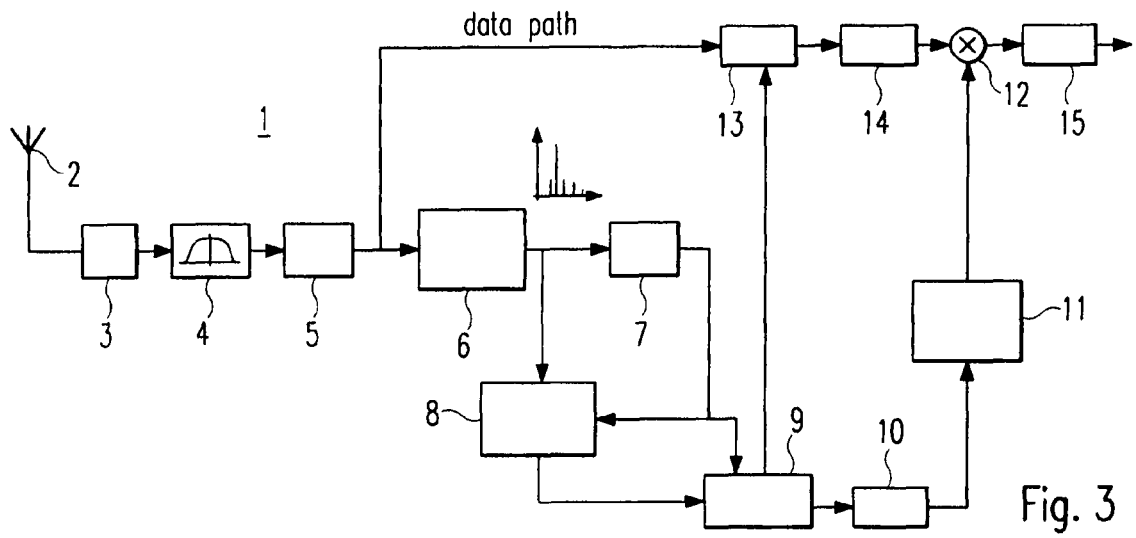
Figure 4:
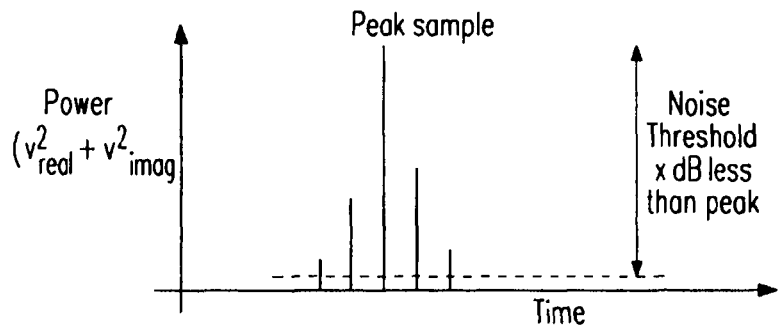
Figure 5A:
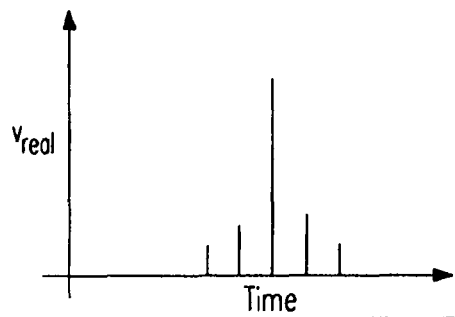
Figure 5B:
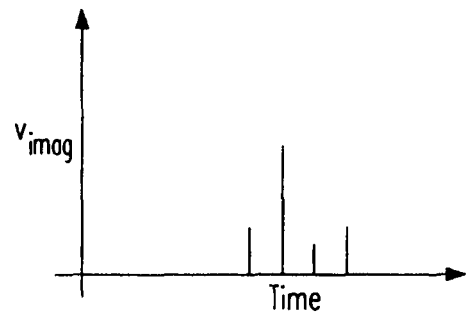
Figure 6:
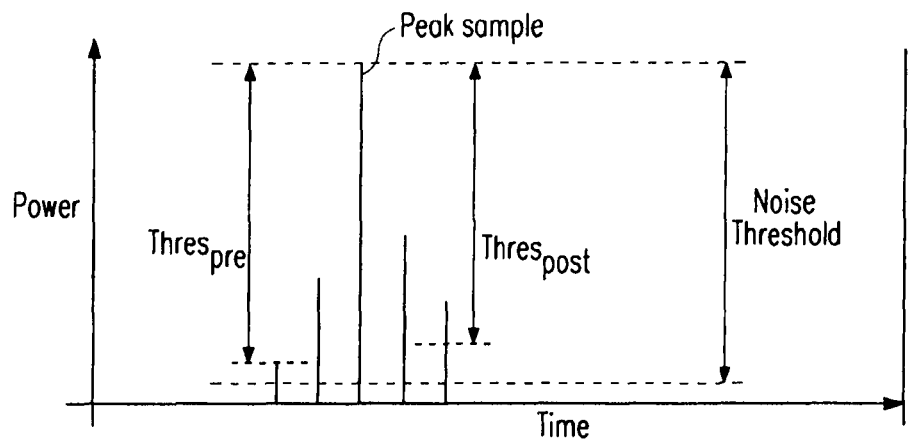

The present invention is explained in more detail in the following description of a preferred embodiment in relation to the enclosed drawings, in which FIG. 1 shows a schematic example of a frame structure, FIGS. 2*a* and 2*b* show examples of a data block structure, FIG. 3 shows a schematic block diagram of a receiving apparatus according to the present invention, FIG. 4 shows a schematic example of a channel estimation result, FIGS. 5*a* and 5*b* show a real part and an imaginary part, respectively, of the channel estimation result of FIG. 4, and FIG. 6 shows a schematic example of the channel estimation result of FIG. 4 with various parameters applied by a windowing means of the present invention.

The present invention relates to a receiving apparatus and a method for receiving signals in a wireless communication system, in which an equalization is performed on the received signals in the frequency domain although the present invention is particularly applicable to single carrier wireless systems, it could also be applied in multicarrier wireless systems.

FIG. 1 shows a schematic example of a frame structure for the signals transmitted and received in a wireless communication system as used by the receiving apparatus and the method of the present invention. The frame structure comprises a synchronization part (Sync), which is followed by start frame delimiter (SFD), which is followed by a channel estimation sequence (CES), which is then followed by one or more data blocks. The synchronization part is used in the receiving apparatus for automatic gain control and coarse frame timing. The SFD indicates the end of the synchronization sequence and the beginning of the channel estimation sequence. The channel estimation sequence may be any kind of suitable sequence which is used for channel estimation and the receiving apparatus. The data blocks are used to communicate content data of any suitable kind.

FIGS. 2*a* and 2*b* show two different possibilities for arranging data blocks wireless communication system. FIG. 2*a* shows a first possibility in which each block of N data symbols (N being an integer >1) is separated from the next data block by a guard interval which comprises G symbols (G being an integer >1), for example consisting of cyclically extended samples from the data symbols (normally N>G). FIG. 2*b* shows a second example in which N-G data symbols comprising the content data and G symbols forming a guard interval form a data block of a length N so that the data blocks are immediately adjacent to each other but the content data are separated by the guard intervals of the symbols. The guard intervals respectively comprise the same information so that the structure is also called a common word block structure.

Both systems shown in FIGS. 2*a* and 2*b* typically use a time to frequency transformation, such as a Fast Fourier transformation (FFT) or Digital Fourier transformation (DFT) of a size N on the received data signals before the equalization is performed in the frequency domain.

FIG. 3 shows a schematic block diagram of receiving apparatus 1 for receiving signals in a wireless communication system according to the present invention. It has to be noted that FIG. 3 and the following explanation only refers to elements of the receiving apparatus 1 which are necessary for the understanding of the present invention. In a practical application, the receiving apparatus 1 will contain additional functionalities for a normal operation.

The receiving apparatus 1 comprises an antenna 2 adapted to receive wireless signals in the wireless communication systems. The received signals are forwarded to a RF (radio frequency) unit or the like adapted to down-convert the received signal to the baseband. The received down-converted signals are then forwarded to an analogue pulse filter 4 which has normally the same pulse shape as the transmitted pulse. The pulse shaped signals are then forwarded to an analogue to a digital converter 5. It has to be noted that it is also possible to implement a digital filter instead of the analogue pulse filter 4, whereby such a digital filter would be located after the analogue to digital converter 5. The digital outputs of the analogue to digital converter are then split into multiple branches, whereby FIG. 3 only shows two branches for the sake of clarity. One branch is used to process the data and the other branch is used to perform channel estimation and timing. Additional branches which were not shown may include blocks to perform frequency offset compensation; clock offset compensation and so forth.

In the channel estimation branch, the output of the analogue to digital converter 5 is forwarded to a channel estimation means 6 which is adapted to perform a channel estimation on the dedicated channel estimation sequence comprised in a received signal, as for example a channel estimation sequence as shown for the frame structure in FIG. 1. The channel estimation means 6 can be any kind of suitable channel estimator, such as but not limited to an auto-correlator, a cross-correlator, a matched filter structure or the like. An example of a power output of the channel estimation means 6 is shown in FIG. 4. The channel estimation result output from the channel estimation means 6, which is normally a multi-path power delay profile, can be represented as a number of digital complex samples arranged in the time domain, wherein each complex sample has a certain power level (square of the amplitude of the real part added to the square of the amplitude of the imaginary part). While most of the digital complex samples will have power levels which correspond to noise, several of the digital complex samples will show enhanced power levels as indicated in FIG. 4. The channel estimation result output from the channel estimation means 6 is supplied to a peak detection means 7 which is adapted to detect the complex sample having the highest power level of the samples of the channel estimation result. The complex sample with the highest power level is then determined as the peak sample as indicated in FIG. 4. The channel estimation result may comprise further peaks having lower power levels, each of the peaks corresponding to a transmission path in a multipath environment.

The channel estimation result output from the channel estimation means 6 is also supplied to a noise reduction means 8 which is adapted to reduce the noise in the channel estimation result by setting these samples of the channel estimation result which are below a noise threshold to zero. In FIG. 4, an example for a noise threshold level is marked. The samples having a power level above the noise threshold are maintained and all sampled having a power level below the noise threshold are set to zero by the noise reduction means 8. Hereby, the noise could be a fixed and preset threshold level which is always applied to every channel estimation result output from the channel estimation means 6. Alternatively, the noise threshold could be a variable threshold which is set depending on the power level of the peak sample, i.e. in relation to the highest power level detected in the channel estimation result. For example, the noise threshold could always have a fixed or preset difference in relation to the power level of the peak sample, i.e. could for example always be at a preset difference below the highest power level as indicated in FIG. 4. Alternatively, the difference between the noise threshold level and the highest power level of the peak sample could not be preset, but could be varied and adaptable depending on a detected or estimated quality parameter of the received signal. For example, the difference between the noise threshold and the highest power level could be varied depending on a signal to noise ratio, or any other suitable parameter. Thus, the position and the power level of the peak sample is provided from the peak detection means 7 to the noise reduction means 8, which sets the noise threshold and removes the signal components which are below the noise threshold level, i.e. sets the corresponding samples to zero.

The correspondingly noise reduced estimation result is then output from the noise reduction means 8 and supplied to a windowing means 9, which is adapted to arrange the noise reduced estimation result in a window having a preset number of samples. The preset number of samples hereby correspond and is equal to the size of the data blocks in the received signal, as explained in relation to FIGS. 2a and 2b, and therefore identical to the size of the time to frequency transformation which is performed on the data signals in the data branch before the equalization (which takes place in the frequency domain). In the data branch of the receiver apparatus 1 shown in FIG. 3, the received data are subjected to a time to frequency transformation in a corresponding time to frequency transformation means 14, which can for example be a FFT, a DFT or the like. The time to frequency transformation means 14 has a size of for example N, corresponding to the example of FIGS. 2a and 2b, thereby being able to perform a time to frequency transformation on entire data blocks.

However, the channel estimation performed in the channel estimation means 6 is performed on a channel estimation sequence which has normally a smaller size of the data blocks, for example a size of G which is equal to the length of the guard intervals, as explained in relation to FIGS. 2a and 2b. Since G is smaller than N, the present invention suggests the windowing means 9 which arranges the channel estimation result in a window having a length with correspondence to the length of the time to frequency transformation in the time to frequency transformation means 14 (in the shown example a length of N). In case the frequency transformations means 14 is a FFT, it would be an N point FFT (or an N point DFT). Hereby, the windowing means 9 as suggested by the present invention arranges the useful samples, i.e. the samples of the channel estimation result having a power level which can be used and will give a contribution in the succeeding equalization. All other samples of the window are set to zero (keeping in mind that the number of samples in the original channel estimation result already have been set to zero in the noise reduction means 8).

In general words, the windowing means 9 is adapted to determine the number of useful samples before and after the peak sample detected by the peak detection means 7 and by setting the remaining samples to zero. In other words, a number of complex samples before and after the peak complex sample are kept and maintained and all other complex samples are set to zero. In order to achieve this windowing in the window means 9, several possibilities can be realized, which will be explained further below in detail in relation to FIG. 6. The output of the windowing means 9 is a block of complex samples having a size and a number of samples with correspondence to the size of the frequency to time transformation means 14 in the data path, but is itself forwarded with time to frequency transformation means 10, which is for example a FFT, DFT or the like having the same size (for example N point FFT, N point DFT or the like), wherein the output of the windowing means 9 is transformed from the time domain to the frequency domain. The frequency domain output from the time to frequency transformation means 10 is then forwarded to a equalizer coefficient calculation means 11, which is adapted to calculate equalizer coefficients from the frequency domain channel estimates, for example by using zero forcing (ZF), minimum mean square error (MMSE) or any other suitable criteria. The calculated equalizer coefficients are then forwarded to an equalizer 12 which is adapted to multiply the equalizer coefficients with the frequency domain data samples output from the time to frequency transformation means 14 in order to perform an equalization of the data in the received signal. The equalized data samples are then transformed back to the time domain by a succeeding frequency to time transformation means 15, which could for example be an inverse FFT (IFFT), a IDFT or the like. The time domain samples output from the frequency to time domain transformation means 15 are then further processed as necessary in the receiving apparatus, for example by demodulation, channel decoding and so forth. It has to be further noted that the windowing means 9 is further adapted to supply timing information to a timing means 13 which is located in the data branch before the time to frequency transformation means 14. The time information contains information about the position, i.e. the timing, of the first useful sample in the window generated by the windowing means 9, which is used in the timing means 13 for the time synchronization in data branch which is necessary for the succeeding time to frequency transformation in the time to frequency transformation means 14 and the equalization in the equalizer 12.

As indicated above, the arrangement of the noise reduced channel estimation result in a window performed by the windowing means 9 can be done in several different ways which are explained in the following in relation to FIG. 6. FIG. 6 generally shows a schematic example of the channel estimation result as output from the channel estimation means 6, in which digital samples are arranged in the time domain succeeding each other, each sample having a certain power level. As explained, in the noise reduction means 8, the noise threshold is applied whereby each sample below the noise threshold level is set to zero. The correspondingly resulting noise reduced channel estimation result is then arranged in the windowing means 6 in a window having a preset number of samples, whereby the preset number corresponds to the size (number of samples) of the time to frequency transformation means 14 and 10. Hereby, a number of samples before and after the detected peak sample in the window are maintained in the noise reduced channel estimation result and all other samples within the window are set to zero. This means that normally the number of use the resulting useful samples is smaller than the number of samples contained in the channel estimation result output from the channel estimation means 6.

A first possibility to select the number of useful samples before and after the peak sample is to apply preset numbers for the samples before and after the peak sample. This means that a fixed number of samples before the peak sample is selected and a fixed number of samples after the peak samples is selected, whereby the number of selected samples before and after the peak sample can be the same but can also be different from each other. That is, for each channel estimation result, always the fixed preset number of samples before and after the peak sample are selected in order to establish the number of useful samples. All other samples within the window outside the preset number of samples before and after the peak sample are set to zero. An example value for the preset number before and after the peak sample are a length of half of a guard interval (G/2), but any other suitable length and number of samples can be used.

A second possibility is to use a fixed number of samples before the peak sample as described in the first possibility, but to use an adaptive number of samples after the peak sample. Hereby, the number of samples after the peak sample is determined in the windowing means 9 by using a post threshold ($Thres_{post}$). The post threshold is set in relation to the power level of the peak sample and is either arranged in a fixed difference to or distance to the power level of the peak sample or a variable distance or difference to the power level of the peak sample. The variable distance or difference may hereby depend on other parameters or measurements, such as for example characteristic parameters of the received signal quality, such as a signal to noise ratio or the like. Thus, the last sample after the peak sample (in the time direction) having a power level above the post threshold is determined as the last sample and all other following samples are set to zero. Thus, the number of useful samples are all samples comprising the preset number of samples before the peak sample and the samples between the peak sample and the detected last sample. All other samples are set to zero. Hereby, it might be advantageous to apply the additional condition that the time difference between the peak sample and the last sample should not be greater than a certain time interval.

A third possibility is to apply a preset number of samples after the peak sample as explained in the first possibility and to use a pre-threshold to determine the number of useful samples before the peak sample. Hereby, the pre-threshold ($Thres_{pre}$) is determined in relation to the power level of the peak sample and is arranged in a fixed or variable difference or distance below the power level of the peak sample as indicated in FIG. 6. The first sample of the noise reduced channel estimation result (in the time direction) above the pre-threshold is determined as the first sample and all samples between the first sample and the peak samples are maintained. Further, all samples between the peak sample and the preset number of samples after the peak samples are maintained, so that the samples between the first sample and the last sample of the preset number of samples after the peak sample are determined as the useful samples. All other samples in the window are set to zero. The pre-threshold can be fixed or variable. The variable pre-threshold could for example vary depending on other measurements or detections, for example in relation to parameters or characteristics of the signal quality, such as the signal to noise ratio or the like. Further, for the determination of the first sample, an additional time condition could be applied in that the time distance between the first sample and the peak sample can not be larger than a certain preset time period.

In a fourth possibility, both the number of samples before the peak sample and after the peak sample are adaptive and are determined by using a pre-threshold as explained in the third possibility and a post threshold as explained in the second possibility.

The present invention is advantageous in that only useful samples are used in the equalization and all other samples are set to zero by the noise reduction means 8 and the windowing means 9. Also, by the windowing means 9, the window size of the noise reduced channel estimation result is adapted to the size of the subsequent time to frequency transformation in the data path as well as in the channel estimation path so that the performance of the equalization is enhanced.

The invention claimed is:

1. A receiving apparatus for receiving signals in a wireless communication system, in which the signals comprise a dedicated channel estimation sequence, the receiving apparatus comprising:
   a channel estimation unit configured to perform a channel estimation on the dedicated channel estimation sequence comprised in a received signal;
   a peak detection unit configured to detect a complex sample having the highest power level of complex samples of the channel estimation result as a peak complex sample;
   a noise reduction unit configured to reduce noise in the channel estimation result obtained from the channel estimation unit by setting complex samples of the channel estimation result which are below a noise threshold to zero;
   a windowing unit configured to arrange the noise reduced channel estimation result in a window having a preset number of complex samples by determining the number of useful complex samples before and after the peak complex sample and setting the remaining complex samples to zero; and
   a frequency domain equalizing unit configured to perform an equalization on the received signal in frequency domain on the basis of the windowing unit.

2. The receiving apparatus according to claim 1, wherein said noise reduction unit is configured to set the noise threshold in relation to a power level of the samples of the channel estimation result.

3. The receiving apparatus according to claim 1, wherein said noise reduction unit is configured to set the noise threshold in relation to the detected highest power level.

4. The receiving apparatus according to claim 3, wherein said noise reduction unit is configured to set the noise threshold with a fixed difference to the detected highest power level.

5. The receiving apparatus according to claim 3, wherein said noise reduction unit is configured to set the noise threshold with a variable difference to the detected highest power level.

6. The receiving apparatus according to claim 5, wherein said noise reduction unit is configured to set said variable difference depending on a quality of the received signal.

7. The receiving apparatus according to claim 1, wherein said windowing unit is configured to determine a respective preset number of complex samples as the useful samples before and after the peak complex sample.

8. The receiving apparatus according to claim 1, wherein said windowing unit is configured to detect a first complex sample in the window before the peak complex sample having a power level above a pre threshold and to determine the samples between said detected first complex sample and a preset number of samples after the peak complex sample as the useful samples.

9. The receiving apparatus according to claim 1, wherein said windowing unit is configured to detect a last complex sample in the window after the peak complex sample having a power level above a post threshold and to determine the samples between a preset number of samples before the peak complex sample and said detected last complex sample as the useful samples.

10. The receiving apparatus according to claim 1, wherein said windowing unit is configured to detect a first complex sample in the window before the peak complex sample having a power level above a pre threshold and a last complex sample in the window after the peak complex sample having a power level above a post threshold and to determine the samples between said detected first complex sample and said detected last sample as the useful samples.

11. The receiving apparatus according to claim 8, 9 or 10, wherein said windowing unit is configured to set the pre threshold and the post threshold, respectively, in relation to the power level of the peak sample.

12. The receiving apparatus according to claim 11, wherein said windowing unit is configured to set the pre threshold and the post threshold, respectively, with a fixed difference to the detected highest power level.

13. The receiving apparatus according to claim 11, wherein said windowing unit is configured to set pre threshold and the post threshold, respectively, with a variable difference to the detected highest power level.

14. The receiving apparatus according to claim 1, further comprising a timing unit configured to perform a time synchronization on data comprised in the received signal, wherein said windowing unit is configured to supply timing information to said timing unit on the basis of a first complex sample of said useful samples in the window.

15. A method for receiving signals in a wireless communication system, in which the signals comprise a dedicated channel estimation sequence, the method comprising the steps of:
performing a channel estimation on the dedicated channel estimation sequence comprised in a received signal;
detecting a complex sample having the highest power level of complex samples of the channel estimation result as a peak complex sample;
reducing noise in the channel estimation result obtained from the channel estimation step by setting complex samples of the channel estimation result which are below a noise threshold to zero;
arranging the noise reduced channel estimation result in a window having a preset number of complex samples by determining the number of useful complex samples before and after the peak complex sample and setting the remaining complex samples to zero; and
performing an equalization on the received signal in frequency domain on the basis of the arranging step.

* * * * *